(12) United States Patent
Pulley et al.

(10) Patent No.: US 7,349,497 B1
(45) Date of Patent: Mar. 25, 2008

(54) RECEIVER CIRCUIT

(75) Inventors: Douglas Roger Pulley, Bath (GB); Thomas Foxcroft, Bristol (GB)

(73) Assignee: Conexant Systems, Inc., Newport Beach, CA (US)

(*) Notice: Subject to any disclaimer, the term of this patent is extended or adjusted under 35 U.S.C. 154(b) by 755 days.

(21) Appl. No.: 09/617,587

(22) Filed: Jul. 18, 2000

(30) Foreign Application Priority Data

Jul. 19, 1999 (GB) .................................. 9916894.0

(51) Int. Cl.
*H04L 27/06* (2006.01)

(52) U.S. Cl. ..................................................... 375/343

(58) Field of Classification Search ................ 375/316, 375/340, 341, 342, 343, 344, 345, 346, 347, 375/348, 354, 355, 142, 143, 150, 152; 704/216, 704/218, 237, 263; 708/5, 422, 813; 342/108, 342/145, 189, 378
See application file for complete search history.

(56) References Cited

U.S. PATENT DOCUMENTS

| 5,909,436 | A | * | 6/1999 | Engstrom et al. | ........... 370/343 |
| 6,084,927 | A | * | 7/2000 | Pon | ............. 375/343 |
| 6,178,025 | B1 | * | 1/2001 | Hardcastle et al. | ......... 359/177 |
| 6,459,744 | B1 | * | 10/2002 | Helard et al. | ................ 375/354 |
| 6,522,866 | B1 | * | 2/2003 | Merkle et al. | ................. 455/59 |
| 6,567,482 | B1 | * | 5/2003 | Popovic' | ..................... 375/343 |
| 6,628,730 | B1 | * | 9/2003 | Stott et al. | ................... 375/344 |
| 2002/0057729 | A1 | * | 5/2002 | Farbod et al. | .............. 375/150 |

FOREIGN PATENT DOCUMENTS

| EP | 0 689 313 A2 | 5/1995 |
| EP | 0 798 903 A2 | 3/1997 |

* cited by examiner

*Primary Examiner*—Sam K. Ahn
(74) *Attorney, Agent, or Firm*—The Eclipse Group LLP

(57) ABSTRACT

A receiver circuit is for processing a received signal which includes at least a first portion and a second portion which repeats the content of the first portion after a repeat interval. For example, the receiver may be for DVB-T signals using COFDM. In order to ensure that the estimated symbol start position is accurate, the receiver calculates two correlation values, namely an early correlation and a late correlation. The early correlation is measured between samples ahead of an assumed first portion start position and ahead of an assumed second portion start position, and the late correlation is measured between samples behind an assumed first portion end position and behind an assumed second portion end position. When the assumed start and end positions are accurate, the early and late correlations are equal, and so the assumed start and end positions are controlled to equalize the early correlation and the late correlation.

14 Claims, 2 Drawing Sheets

RECEIVER CIRCUIT

TECHNICAL FIELD OF THE INVENTION

This invention relates to a receiver circuit, in particular for receiving signals in which a portion of a transmitted signal is repeated after a known time interval.

BACKGROUND OF THE INVENTION

The European DVB-T (Digital Video Broadcasting-Terrestrial) standard for digital terrestrial television (DTT) uses Coded Orthogonal Frequency Division Multiplexing (COFDM) of transmitted signals, which are therefore transmitted as OFDM symbols.

Received signals are sampled in a receiver, and accurate reception and demodulation of signals therefore requires accurate knowledge of the positions of the beginning and end of each OFDM symbol.

In particular, DVB-T COFDM signals include a cyclic prefix to each active symbol, which is repeated after a known and fixed time interval. These cyclic prefixes must be correctly removed before demodulation, or the demodulation performance can be seriously degraded.

The fact that the prefix in the COFDM signals is repeated can be used initially to find the position of the prefix, by calculating a running correlation between received portions which are received separated by the known time interval. A very high correlation will indicate the presence of a repeated portion. However, this does not allow correction for any changes in position caused by subsequent variations in sampling rate.

SUMMARY OF THE INVENTION

The present invention provides a receiver which overcomes some of the disadvantages of the prior art.

This invention relates in a first aspect to a receiver which can maintain the assumed position of the active symbols in the signal accurately, as compared with the actual position in the received signal, thereby advantageously allowing feedback control of the sample position of the receiver.

According to a second aspect of the invention, there is provided a method of processing received signals, and controlling the sampling position of a receiver.

In particular, according to the invention, there is provided a receiver circuit, comprising:

a sampler, for taking digital samples of a received signal, said received signal including at least a first portion and a second portion which repeats the content of the first portion after a repeat interval;

a processing device, for processing the digital samples on the basis of an assumed position of the first and second portions in the received signal;

at least one correlator for measuring:

a first correlation between a first group of samples including at least samples around the beginning of the first portion of the signal, and a second group of samples including at least samples around the beginning of the second portion of the signal; and a second correlation between a third group of samples including at least samples around the end of the first portion of the signal, and a fourth group of samples including at least samples around the end of the second portion of the signal;

means for comparing the measured first and second correlations to produce a comparison output; and means for determining the assumed position of the first and second portions on the basis of the comparison output in order to tend to equalize the first and second correlations.

Preferably, the first, second, third and fourth groups of samples include samples immediately preceding and immediately following the respective beginning or end point of the first or second portion.

DETAILED DESCRIPTION OF PREFERRED EMBODIMENTS

Figure 1:
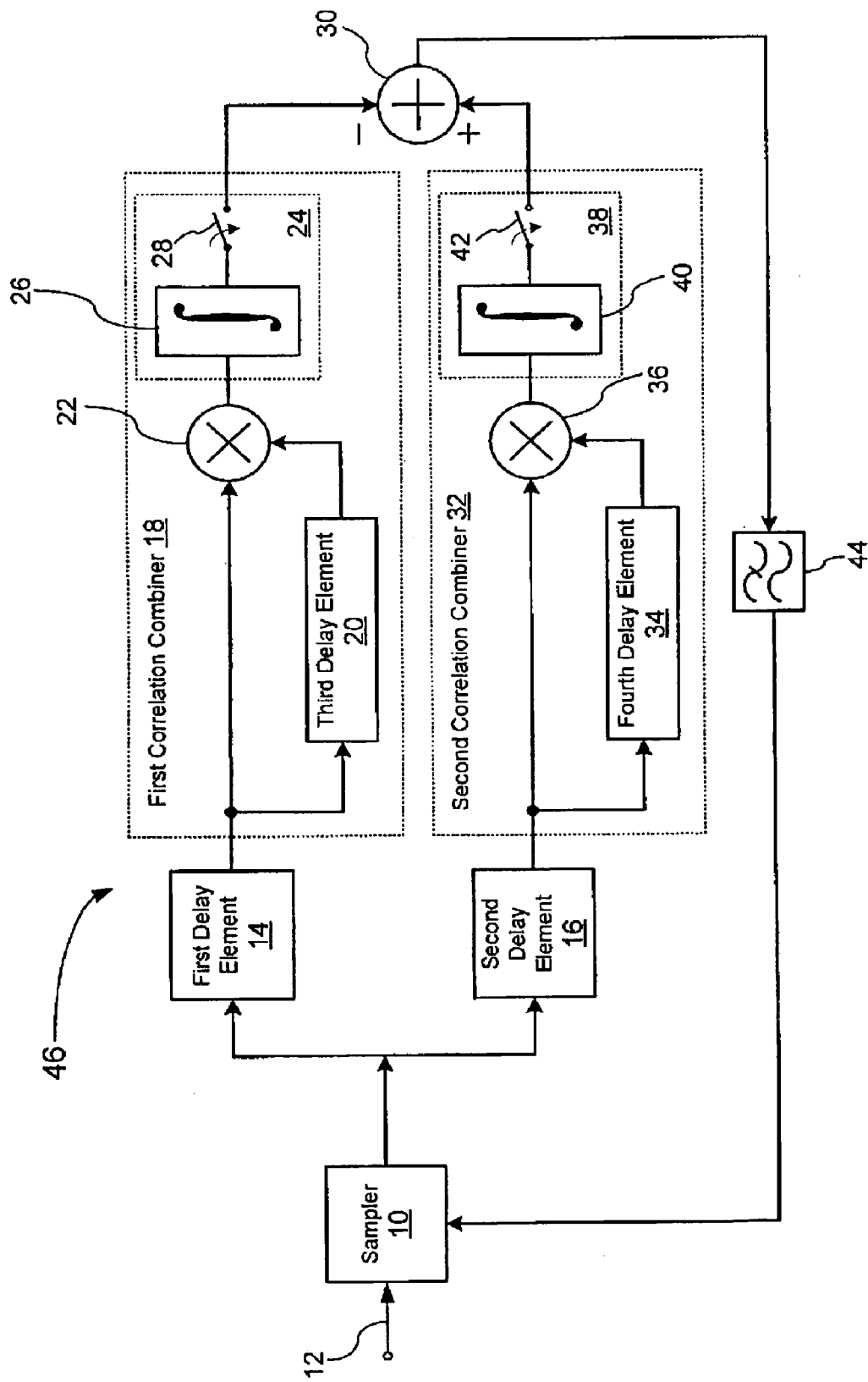
FIG. 1 is a schematic illustration of a part of a receiver circuit in accordance with the invention.

FIG. 1 shows a section of a receiver circuit relevant to the present invention. Typically, in the exemplary case of a digital terrestrial television signal receiver, for example receiving signals using the DVB-T standard with Coded Orthogonal Frequency Division Multiplexing, the receiver will include an antenna (not shown), and a tuner (not shown) for receiving the signals and downconverting to an intermediate frequency.

The receiver further includes a sampler 10 which receives signals, after conversion to baseband, at an input 12. For example, the sampler is preferably a voltage controlled crystal oscillator with an analog-digital converter or a digital resampler, for producing baseband digital I and Q samples. In this example, the sampler produces (64/7) Msamples/second for both I and Q samples. The sampler is controllable in the sense that its sampling position can be adjusted. Output signals from the sampler 10 may be supplied to processing device (not shown) that, amongst other things, remove the cyclic components which proceed each active symbol. In order to be able to do this accurately, the sampling position of the sampler 10 must be controlled such that the assumed position of the start of each symbol accurately coincides with the actual position in the received signal. Where the sampler 10 is a resampler, this control of the sampling position is achieved by adjusting its phase.

The received COFDM signal includes a portion which is repeated after a known and fixed time interval. Specifically, in this example it includes a portion which is 64 samples long, and which is repeated after an interval (the repeat interval) of 2048 samples (measured from the start of the portion to the start of the repeated portion).

It will be appreciated that the order in which signals are downconverted to baseband, converted to I and Q, and sampled, is not relevant to the invention.

It should also be noted that, while several parameters quoted herein relate specifically to the current United Kingdom specification for DVB-T, the values of such parameters are not relevant to the invention, which may be applied to any suitable signal format.

The sampled signal output from the sampler 10 is supplied to a first delay element 14 and a second delay element 16, which applies a delay having a duration of two samples. The first delay element effectively advances the signal by a duration of two samples. Of course, this is not possible. In practice, the first delay element actually applies a delay of twice two samples, and there is no second delay element, with the extra two sample delay being compensated later in the processing. The exact duration of the delays is not critical, as it could be any number of samples, conveniently an integer number. A small delay gives improved noise performance, while a large delay increases the range of errors which can be corrected in each measurement and correction cycle.

The signal from the first delay element 14 is applied to a first correlation combiner 18, which includes a third delay element 20, which applies a delay equal to the repeat interval, that is, 2048 samples. A correlator 22 receives as a first input the signal from the first delay element 14, and as a second input the delayed output from the third delay element 20.

The correlation between these two inputs is determined on a sample-by-sample basis in the correlator 22, and output to a further block 24, which includes an integrator 26. The integrator 26 accumulates the results of the individual sample-by-sample correlations determined by the correlator 22, and a sampling switch 28 gates the output and resets the integrator 26 to provide an output correlation value, measured over the whole 64 samples of the repeated portion of the signal, to a first input of a subtractor 30. A running correlation is used initially to find the position of the repeated portion of the signal, so that the correlations described above are calculated only for the repeated portion of the signal.

Because the first delay element 14 effectively advanced the signal, this output is regarded, as an early correlation.

Similarly, the output from the second delay element 16 is applied to a second correlation combiner 32, which includes a fourth delay element 34, which applies a delay equal to the repeat interval. Thus, with a repeat interval of 2048 samples, the fourth delay element 30 applies a delay of 2048 samples. A second correlator 36 receives as a first input the signal from the second delay element 16, and as a second input the further delayed output from the fourth delay element 34.

The correlation between these two inputs is determined on a sample-by-sample basis in the correlator 36, and output to an further block 38, which includes an integrator 40. The integrator 40 accumulates the results of the individual sample-by-sample correlations determined by the correlator 36, and a sampling switch 42 gates the output and resets the integrator to provide an output correlation value, measured over the whole 64 samples of the repeated portion of the signal, to a second input of the subtractor 30.

Because the second delay element 16 delayed the signal, this output is regarded as a late correlation.

The correlation result for each OFDM symbol, R, is the magnitude of the complex correlation across N samples of the cyclic repeat:

$$R = \left| \sum_{m=0}^{N-1} x_m x_{m+N_R} \right|$$

where * denotes the complex conjugate of a complex value, $x_k$ are the samples of the signal and $N_R$ is the number of samples between a sample of the cyclic prefix and its repeat. Either $x_m$ or $x_{m+N_R}$ maybe conjugated in this calculation and m=0 is taken to be the first sample of the assumed start of the cyclic prefix for a particular symbol.

The early correlation can be written as:

$$R_E = \left| \sum_{m=0}^{N-1} x_{m-2} x^*_{m-2+N_R} \right|$$

and the late correlation as:

$$R_L = \left| \sum_{m=0}^{N-1} x_{m+2} x^*_{m+2+N_R} \right|$$

The subtractor 30 receives the two correlation values as inputs, and therefore provides an output signal which is a measure of the difference between the correlation values calculated in the correlation combiners 18, 32 respectively. The full significance of this will be described in more detail with reference to FIG. 2 below.

More specifically, the difference between the correlation values is taken to be proportional to the time error in the initially assumed sampling position. Thus:

$$\Delta t \propto \left| \sum_{m=0}^{N-1} X_{m-2} X^*_{m-2+N_R} \right| - \left| \sum_{m=0}^{N-1} X_{m+2} X^*_{m+2+N_R} \right|$$

The output signal from the subtractor 30 is supplied to a feedback loop filter 44 which appears in a feedback loop 46, and the output thereof is applied to the sampler 10 to control the sampling position.

Thus, if the result of the correlation calculations is that the input signal is found to be more closely correlated with the delayed signal or the effectively advanced signal, a correction is applied to the sampling position which will tend to equalize these correlations.

A more detailed explanation of the operation of the circuit will now be given with reference to FIG. 2.

Figure 2:
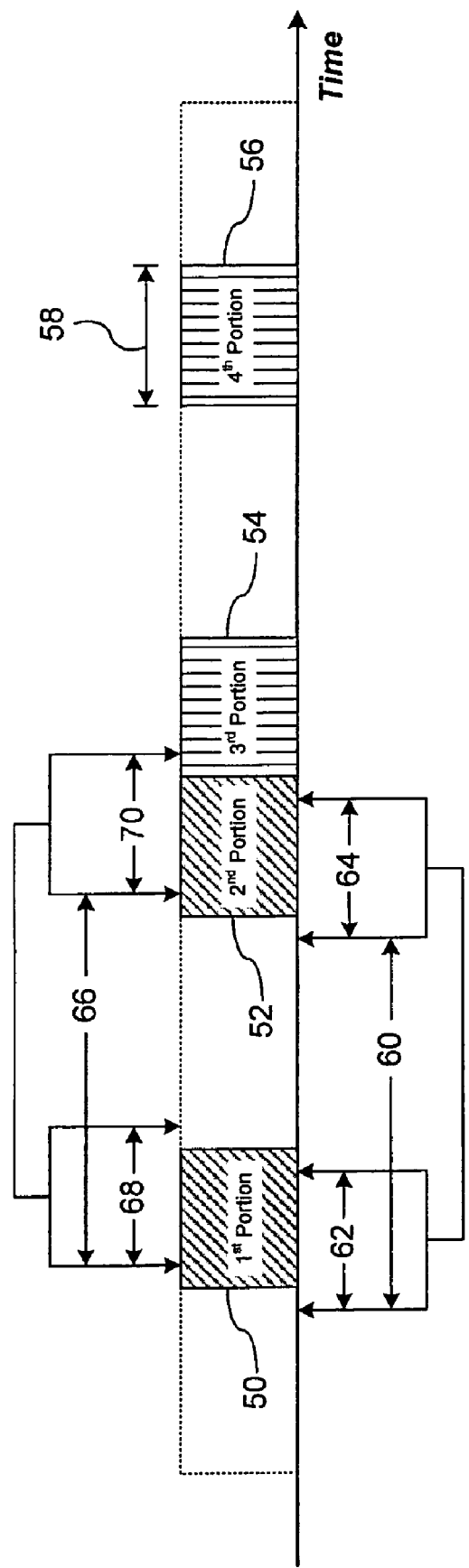
FIG. 2 is an explanatory diagram provided for a better understanding of the present invention.

FIG. 2 is a partial schematic illustration (not to scale) of the time history of a digitally sampled received COFDM signal. The signal includes a first portion 50, and a second portion 52, which is identical thereto and can therefore be seen as a repeat of the first portion. The signal also includes a third portion 54, and a fourth portion 56, which is identical thereto an can therefore be seen as a repeat of the third portion. The first, second, third and fourth portions 50, 52, 54, 56 may each have a duration 58 to 64 samples.

The start of the second portion is 2048 samples after the start of the first portion, and the start of the fourth portion is 2048 samples after the start of the third portion. Thus, the repeat period is 2048 samples. Therefore if either the first or third portion of the signal were delayed by 2048 samples, it would be found to be exactly correlated (ignoring distortions, noise, etc.) with the signal actually being received at that time.

When demodulating signals, it is important to know exactly when to expect to receive the start of each active symbol. This also allows other data, for example the cyclic prefixes which appear before each active symbol, to be removed. An error can mean that the receiver has a reduced ability to remove "ghost" images from the received signal, or can mean that the receiver is unable to reproduce any picture at all.

FIG. 2 shows a delay 60 of 2048 samples as applied by the third delay element 20 to a signal portion 62 that is two frames in advance of the portion 50 that is to be repeated, and which produces a delayed signal portion 64. Thus, the correlator 22 measures the correlation between the delayed signal portion 64 and the signal portion actually received at the same time. To the extent that signal portion 62 overlaps with signal portion 50, the delayed signal portion 64 is perfectly correlated (again ignoring distortions, noise, etc.) with the signal portion actually received at the same time. However, to the extent that signal portion 62 does not overlap with signal portion 50, the delayed signal portion 64 is broadly uncorrelated with the signal portion actually received at the same time.

FIG. 2 also shows a delay 66 of 2048 samples as applied by the fourth delay element 34 to a signal portion 68 that is two samples behind the portion 50 that is to be repeated, and which produces a delayed signal portion 70. Thus, the correlator 36 measures the correlation between the delayed signal portion 70 and the signal portion actually received at the same time. To the extent that signal portion 68 overlaps with signal portion 50, the delayed signal portion 70 is perfectly correlated (again ignoring distortions, noise, etc.) with the signal portion actually received at the same time. However, to the extent that signal portion 68 does not overlap with signal portion 50, the delayed signal portion 70 is broadly uncorrelated with the signal portion actually received at the same time.

If the assumed sampling position is exactly synchronized with the transmitted signal, then the signal portion 62 would begin exactly two samples before the signal portion 50. The delayed signal portion 64 would then be correlated with the signal portion actually received at the same time for 62 samples out of 64, and uncorrelated for the remaining 2 samples out of 64. Similarly, the delayed signal portion 70 would then be correlated with the signal portion actually received at the same time for 62 samples out of 64, and uncorrelated for the remaining 2 samples out of 64.

Thus, taken over many OFDM symbols, the average values of the measures of correlation, as determined by the two correlation combiners 18, 32, would be exactly equal.

If, by contrast, the sampling position were slightly in advance of the received signal, the signal portion 62 would overlay with signal portion 50 for longer than before, and the delayed signal portion 64 would be more highly correlated with the signal portion actually received at the same time. At the same time, the signal portion 68 would overlap with signal portion 50 for a shorter time than before, and the delayed signal portion 70 would be less highly correlated with the signal portion actually received at the same time.

Conversely, if the sampling position were slightly retarded relative to the received signal, the signal portion 62 would overlap with signal portion 50 for a shorter time than before, and the delayed signal portion 64 would be less highly correlated with the signal portion actually received at the same time. At the same time, the signal portion 68 would overlap with signal portion 50 for a longer time than before, and the delayed signal portion 70 would be more highly correlated with the signal portion actually received at the same time.

Returning to FIG. 1, therefore, a zero output from the filter 44 is produced when the symbol start position of the receiver is exactly synchronized with the received signal, and produces no change in the sampling position. However, a non-zero output from the filter 44 is produced when the sampling position of the receiver is not exactly synchronized with the received signal, and is fed back to control the sampler 10 to produce a change in the sampling position. This change acts to bring the sampling position of the receiver into synchronization with the received signal.

The offset period of two samples, as described above, will often be greater than the actual offset. That being so, the last 60 samples of the signal portion 62 should be exactly correlated (again ignoring distortions, noise, etc.) with the last 60 samples of the signal portion 64, with any uncorrelation being confined to the first 4 samples. It is therefore sufficient to calculate the correlation only during these first 4 samples. Similarly, the first 60 samples of the signal portion 68 should be exactly correlated (again ignoring distortions, noise, etc.) with the first 60 samples of the signal portion 70, with any uncorrelation being confined to the last 4 samples. It is therefore sufficient to calculate the correlation only during these last 4 samples.

In other words, we can assume that, on average, the difference between the overlapping portions of the two correlations is zero. Hence, it is possible to use the following approximation, if calculated over a sufficiently large number of symbols.

$$\Delta t \propto \text{Average}\left\{\left|\sum_{m=0}^{3} X_{m-2} X^*_{m-2+N_R}\right| - \left|\sum_{m=N-4}^{N-1} X_{m+2} X^*_{m+2-N_R}\right|\right\}$$

This modification therefore advantageously reduces the calculations and storage required.

The use of an offset period of two samples means that this is the largest error which can be corrected in each measurement and correction cycle. In the event that the actual offset is greater than two samples, then a correction of two samples is applied in each cycle, until the offset becomes less than two samples.

There are therefore disclosed a receiver circuit, and a method of controlling a sampling position therein, which allows exact synchronization to be achieved between the sampling position and the received sample position.

What is claimed is:

1. A receiver circuit, comprising:
    a sampler, for taking digital samples of a received signal, said received signal including at least a first portion and a second portion which repeats the content of the first portion after a repeat interval;
    a plurality of correlators for measuring:
        a first correlation between a first group of samples including at least samples around the beginning of the first portion of the signal, and a second group of samples including at least samples around the beginning of the second portion of the signal; and
        a second correlation between a third group of samples including at least samples around the end of the first portion of the signal, and a fourth group of samples including at least samples around the end of the second portion of the signal;
    means for comparing the measured first and second correlations to produce a comparison output; and
    means for determining a revised assumed position of the first and second portions on the basis of the comparison output in order to tend to equalize the first and second correlations.

2. A receiver circuit as claimed in claim 1, wherein the first, second, third and fourth group of samples each have the same length as the first and second portions of the signal.

3. A receiver circuit as claimed in claim 2, wherein the first group of samples is offset relative to the first portion of the signal, the second group of samples is offset relative to the second portion of the signal, the third group of samples is offset relative to the first portion of the signal, and the fourth group of samples is offset relative to the second portion of the signal, the durations of said offsets all being equal.

4. A receiver circuit as claimed in claim 3, wherein the duration of said offsets are all equal to two sample periods.

5. A receiver circuit as claimed in claim 1, wherein the first group of samples includes a predetermined number of samples at the beginning of the first portion of the signal, the second group of samples includes a predetermined number of samples at the beginning of the second portion of the signal, the third group of samples includes a predetermined number of samples at the end of the first portion of the signal, and the fourth group of samples includes a predetermined number of samples at the end of the second portion of the signal.

6. A receiver circuit as claimed in claim 1, wherein the received signal is a coded orthogonal frequency division multiplexing "(COFDM)" signal.

7. A method for receiving signals, the method comprising:
taking digital samples of a received signal, said received signal including at least a first portion and a second portion which repeats the content of the first portion after a repeat interval;
measuring a first correlation between a first group of samples including at least samples at the beginning of the first portion of the signal, and a second group of samples including at least samples at the beginning of the second portion of the signal; and
measuring a second correlation between a third group of samples including at least samples at the end of the first portion of the signal, and a fourth group of samples including at least samples at the end of the second portion of the signal;
comparing the measured first and second correlations to produce a comparison output; and
determining a revised assumed position of the first and second portions on the basis of the comparison output in order to tend to equalize the first and second correlations.

8. A method as claimed in claim 7, wherein the first, second, third and fourth group of samples each have the same length as the first and second portions of the signal.

9. A method as claimed in claim 8, wherein the first group of samples is offset relative to the first portion of the signal, the second group of samples is offset relative to the second portion of the signal, the third group of samples is offset relative to the first portion of the signal, and the fourth group of samples is offset relative to the second portion of the signal, the durations of said offsets all being equal.

10. A method as claimed in claim 9, wherein the durations of said offsets are all equal to two sample periods.

11. A method as claimed in claim 7, wherein the first group of samples includes a predetermined number of samples at the beginning of the first portion of the signal, the second group of samples includes a predetermined number of samples at the beginning of the second portion of the signal, the third group of samples includes a predetermined number of samples at the end of the first portion of the signal, and the fourth group of samples includes a predetermined number of samples at the end of the second portion of the signal.

12. A method as claimed in claim 7, wherein the received signal is a "coded orthogonal frequency division multiplexing (COFDM)" signal.

13. A receiver circuit, for processing a received signal, said received signal including at least a first portion and a second portion that repeats the content of the first portion after a repeat interval, the receiver circuit comprising a plurality of correlators, for calculating an early correlation and a late correlation, the early correlation being measured between samples ahead of an assumed first portion start position and ahead of an assumed second portion start position, and the late correlation being measured between samples behind an assumed first portion end position and behind an assumed second portion end position, and revising the assumed start and end positions of the first and second portions on the basis of a calculated difference between the early correlation and the late correlation.

14. A receiver circuit as claimed in claim 13, wherein the received signal is a "coded orthogonal frequency division multiplexing (COFDM)" signal.

* * * * *